July 2, 1929.   L. A. BENOIST ET AL   1,719,818
REFRIGERATING PROCESS AND APPARATUS
Filed Oct. 25, 1926
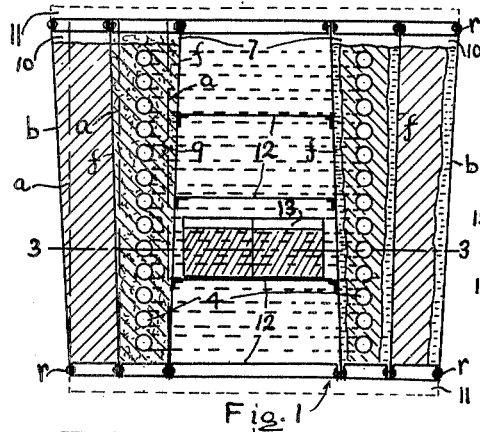
Fig. 1
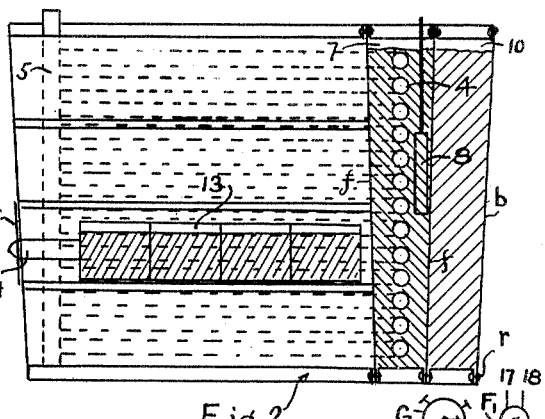
Fig. 2
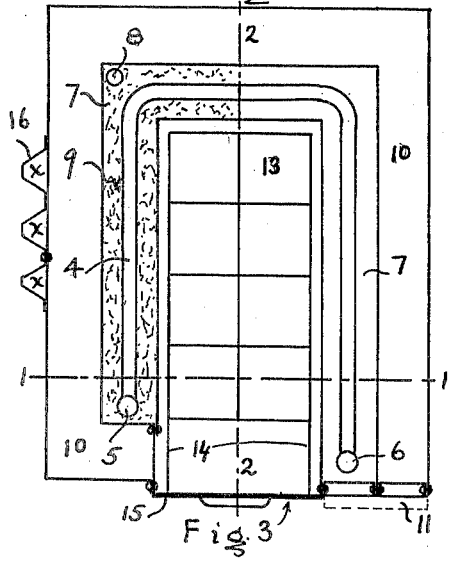
Fig. 3
Fig. 4
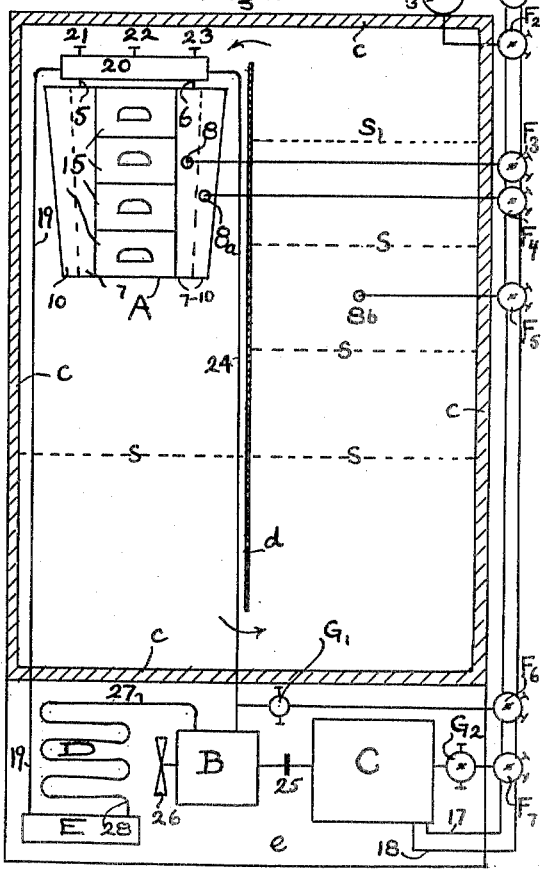
Fig. 5
INVENTORS
Louis A. Benoist
Gardner T. Voorhees
BY
Gardner T. Voorhees
ATTORNEY.

Patented July 2, 1929.

1,719,818

UNITED STATES PATENT OFFICE.

LOUIS A. BENOIST AND GARDNER T. VOORHEES, OF CHICAGO, ILLINOIS.

REFRIGERATING PROCESS AND APPARATUS.

Application filed October 25, 1926. Serial No. 144,160.

Our invention relates to household refrigerating machines, particularly to the so-called cooling and freezing elements of such machines, and to complete refrigerating systems and parts thereof.

Its objects are to make such systems more desirable.

The nature of the invention enables such a system to have a great reserve of refrigerating capacity in a small space, enables ice to stay frozen or to freeze in a warm refrigerator or while the refrigerating machine is not in operation and permits the refrigerating machine to be shut down, during the night, and so avoid noise and prevents the formation of frost in the refrigerator and has numerous other advantages.

In the drawings Figs. 1, 2, and 3 are partly diagrammatic sections through a cooling and freezing element. Fig. 1 being a vertical cross section on line 1, 1, of Fig. 3. Fig. 2 being a vertical longitudinal section on line 2, 2, of Fig. 3. Fig. 3 being a horizontal longitudinal section on line 3, 3 of Fig. 1 Fig. 4 is a partly diagrammatic horizontal longitudinal section through the cooling compartment of a refrigerator, with a cooling element therein. Fig. 5 is a partly diagrammatic vertical cross section through a refrigerator.

In all the figures similar parts generally have like letters or numbers, sometimes with different subscripts.

In Figs. 1, 2 and 3, 4, 5, 6 is a refrigerant chamber of any desired type, here having pipes 4 connected to headers 5 and 6. Coil 4, 5, 6 is in chamber 7 adapted to contain a latent heat of fusion substance, having any desired freezing point and having thermostat 8 therein. If it is desired to more quickly conduct heat to a frozen substance in chamber 7, through a liquid part thereof, then any desired conductors may be used therefor, such for example, as metal shavings 9. 10 is a chamber adapted to contain a latent heat of fusion substance, having any desired freezing point, but usually higher than that of the substance in chamber 7. The quantity of latent heat of fusion substance in chambers 7 and 10 is such as to allow room for its expansion during freezing and, because of the tapered and other arrangements of chambers 7 and 10, the substance, during freezing, does not freeze to any walls without allowing unfrozen substance to expand and vent upwardly so as not to burst a chamber, as would occur if a body of unfrozen liquid were entrapped below frozen liquid above it. 11 is insulation that may be used or not as is desired. Coil 4, 5, 6 and chambers 7 and 10 usually consist of a good conductor of heat, such as metal, and may be of sheet metal joined together in any desired manner as by rivets $r$, $r$, or chambers 7 and 10 may be a casting.

In the preferred form chamber 7 has its side walls $f$, $f$ tapering upwardly and outwardly from the vertical lines $a$, $a$ and chamber 10 has its outer side walls $b$, $b$ tapering upwardly but preferably of taper more than $f$, $f$, so that a vertical section thereof is wider at the top than at the bottom. 12 are conducting shelves contacting with the inner walls of chamber 7 adapted for contact with ice molds 13, for the freezing of water to ice therein. These ice molds preferably having extensions 14 and fronts 15. In Fig. 3 two forms of the front of chambers 7 and 10 are shown, that to the left of line 2, 2 having chamber 10 enclosing the front of chamber 7, while that to the right of line 2, 2 does not enclose the front of chamber 7. Chamber 10 may have conducting projections or fins, such for example, as corrugations 16 contacting with the outer wall of chamber 10 in any desired manner. When corrugations 16 are used they form air passages $x$ and so increase the heat transfer because of exposing both sides and because of increased air velocity through passages $x$.

In the preferred form of operation of the element of Figs. 1, 2 and 3 the operation is as follows. A refrigerant fluid is circulated through coil 4, 5, 6, where 5 may be an inlet and 6 an outlet, which entirely or partially freezes a latent heat of fusion substance in chamber 7 and conducts heat via shelves 12 from water in ice molds 13 and from the latent heat of fusion substance in chamber 10, to entirely or partially freeze the same. The outer part of chamber 10 conducting heat from air in a refrigerator. By the proper proportioning of the various parts of such an element the original water in ice molds 13 is either frozen or maintained frozen and the air in the refrigerator is cooled both while the refrigerant fluid is circulating thru coil 4, 5, 6, or while it is not circulating therein. For example, the substance in chamber 7 may have an average freezing point of say 20° to 25° F. and the substance in chamber 10 may have a freezing point of say 32° F.

Thus the outer surface of chamber 10 will not frost while the inner surface of chamber 7 will be less than 32° F. Due to the latent heat effect of the substances in chambers 7 and 10, a sort of storage battery effect or ability to absorb heat is maintained, while the refrigerant fluid is not in circulation over a considerable period of time. Thermostat 8 functions to cause the circulation of the refrigerant fluid to stop when all or part of the substance in 7 has been frozen and to start the circulation of the refrigerant fluid again when all or part of the substance in 7 has melted. It is obvious that by this arrangement, properly proportioned and governed, that the air in the refrigerator may be maintained cold, at say over 32° F. and the ice in molds 13 maintained frozen, altho the refrigerant fluid has not been in circulation for a considerable period of time, such for example, as say for an 8 to 12 hour period, as during the night. The fact that the outer surface of chamber 10 does not frost obviates the necessity of frequent shut downs for de-frosting and the non-frosting saves the latent heat of fusion of moisture otherwise frozen out of the air and also maintains the outer heat conducting surface of chamber 10 in a sweating state of high heat-conducting efficiency and does not dry the air in the refrigerator, and thus the food, as much as does a frosted surface. The left hand sides of chambers 7 and 10 of Fig. 1 and the right hand sides of Fig. 2 show the latent heat of fusion substance frozen therein, while the right hand parts of chambers 7 and 10 in Fig. 1, show the latent heat of fusion substances partly frozen therein. Any desired substance may be used as either the low or high temperature latent heat of fusion substance, as for example, a brine of a desired specific gravity for the low temperature substance and water for the high temperature substance, or brines of different specific gravities may be used for the two substances or any other desired substance having a desired average or fixed freezing point may be used.

When it is not desired to make and maintain ice in such an element then a modification is used as is shown in Fig. 4 where chamber 7—10 has a latent heat of fusion substance, with a freezing point of say 32° F., which may be water, which is alternately frozen by flow of heat from it to a refrigerant in coil 4, 5, 6 and is thawed by conduction of heat through the walls of chamber 7—10 from the air circulating in contact therewith in the refrigerator, chamber 7—10 offering a constant surface for air cooling, regardless of the amount of frozen substance therein. Here the space $s$, may be used for wire mesh shelves $s$ for food or other purposes. The walls of element 7—10 may have extensions or fins or corrugations as 16 of Fig. 3. The inner surface of the refrigerator may be of metal $m$ and may have a sufficient number of conducting elements $n$ contacting with chamber 7—10 and metal lining $m$, thereby adding a greatly increased air cooling surface to the air cooling surface of chamber 7—10 because of the thus cooled metal refrigerator lining $m$. $8^a$ is a thermostat similar to 8 of Figs. 1, 2, 3.

In Fig. 5 A is an element similar to that of Figs. 1, 2, 3 or may be like that of Fig. 4, in a refrigerator having insulated walls $c$, air circulating partition $d$ and space $e$ for refrigerating machinery. B is a refrigerating machine of any desired type which may be the compressor of the so-called compression refrigerating machine or the absorber generator and liquor pump of the so-called absorption refrigerating machine. C is a means of operation for refrigerating machine B, such for example, as an electric motor when B is a compression machine or C is a source of heat and power when B is an absorption machine. D is a condenser, E is a liquid receiver. $8, 8^a$, $8^b$, are thermostats. $F^1, F^2, F^3, F^4, F^5, F^6, F^7$, are switches to make or break an electric circuit in conductors 17, 18 for the flow of electricity thru C. $G^1$ is an apparatus acted on by a refrigerant's suction pressure adapted to automatically actuate switch $F^6$ adapted to open and close said electric circuit at desired high and low suction pressures. $G^2$ is an automatic apparatus actuated by a shaft of motor C adapted after a desired number of revolutions to actuate switch $F^7$. $G^3$ is a clock adapted to automatically actuate switch $F^2$ at any desired time periods. 19 is a refrigerant liquid pipe leading from liquid tank E to automatic liquid regulator 20, of any desired type which functions, by the manipulations of means 21, 22, 23 to govern the flow of refrigerant liquid either by suction pressure or by liquid level therein. 24 is a suction pipe leading from header 6 or regulator 20 or both to refrigerating machine B. 25 is means to convey energy from C to B, 26 is a fan actuated in any desired manner as by the shaft of compressor B. When B is a compression machine and C is an electric motor the operation is as follows. Liquid refrigerant flows from tank E via pipe 19 to regulator 20 and through header 5 and through a cooling coil in A wherein it is vaporized and flows out therefrom through header 6 and pipe 24 to compressor B, wherein it is compressed and discharged via pipe 27 into condenser D wherein it is liquefied by the conduction of heat therefrom, for example, as by air in contact therewith, the circulation whereof may be increased by fan 26. From condenser D the liquefied refrigerant returns via pipe 28 to liquid receiver E.

The operating period of motor C, is governed by one or more of the switches $F^1, F^2, F^3, F^4, F^5, F^6, F^7$. $F^1$ being a hand governed switch, $F^2$ being governed by clock $G^3$ having means to make it open and close switch $F^2$ at any desired time or times, $F^3$ being actuated from thermostat 8 in chamber 7 and $F^4$ being actuated by thermostat 8ᵃ in chamber 10 or in chamber 7—10, F⁵ being actuated by thermostat 8ᵇ which may be at any desired place in the air of the refrigerator, for example, as at a place where it will have the average refrigerator temperature, F⁶ being governed by suction pressure means G¹, F⁷ being governed by any desired number of revolutions of motor C. G¹ having means to adjust it to operate between any desired suction pressures, G² having means to adjust it to operate after any desired number of revolutions, G³ having means to adjust it to operate at any desired periods of time.

Thermostats 8, 8ᵃ, and 8ᵇ and their switches F³, F⁴, F⁵, having means adapted to cause them to operate between any desired temperature ranges. In the preferred operation thermostat 8 and switch F³ are the only automatic starting and stopping operating means used when element A has chambers 7 and 10 of Figs. 1, 2, and 3. And when element A has chamber 7—10 of Fig. 4, then thermostat at 8ᵃ and its switch F⁴ are the only automatic starting and stopping means used.

What we claim is:—

1. In a refrigerating process the method of freezing a low temperature latent heat of fusion substance by conducting heat therefrom to a refrigerant fluid and freezing a high temperature latent heat of fusion substance, by conducting heat therefrom to said low temperature substance and cooling air by conduction of heat therefrom to said high temperature substance and freezing water into ice by conducting heat therefrom to said low temperature substance.

2. In a refrigerating process the method of freezing a low temperature latent heat of fusion substance by conducting heat therefrom to a circulating refrigerant fluid, to vaporize it, and freezing a high temperature latent heat of fusion substance by conducting heat therefrom to said low temperature substance and cooling air by conducting heat therefrom to said high temperature substance and freezing water into ice by conducting heat therefrom to said low temperature substance.

3. In a refrigerating process the method of freezing a low temperature latent heat of fusion substance by conducting heat therefrom to a circulating refrigerant fluid and freezing a high temperature latent heat of fusion substance by conducting heat therefrom to said low temperature substance and cooling air by conducting heat therefrom to said high temperature substance and freezing water into ice by conducting heat therefrom to said low temperature substance and automatically stopping the refrigerating effect of said refrigerant when the low temperature substance has been all or partly frozen and automatically starting the refrigerating effect of said refrigerant when the low temperature substance has been all or partly melted.

4. In a refrigerating process the method of freezing a low temperature latent heat of fusion substance by conducting heat therefrom to a circulating refrigerant fluid, to vaporize it, and freezing a high temperature latent heat of fusion substance by conducting heat therefrom to said low temperature substance and cooling air by conducting heat therefrom to said high temperature substance and freezing water into ice by conducting heat therefrom to said low temperature substance and automatically stopping the refrigerating effect of said refrigerant when the low temperature substance has been all or partly frozen and automatically starting the refrigerating effect of said refrigerant when the low temperature substance has been all or partly melted.

5. A cooling and freezing element adapted to cool air in a refrigerator and to freeze water into ice, consisting of a chamber adapted to contain a high temperature latent heat of fusion substance and a chamber adapted to contain a low temperature latent heat of fusion substance and a chamber adapted for the circulation of a refrigerant fluid therein, the low temperature chamber being in heat conducting contact with the refrigerant chamber, and with the water to be frozen and with the high temperature chamber, the high temperature chamber being in heat conducting contact with the air to be cooled.

6. A cooling and freezing element adapted to cool air in a refrigerator and to freeze water into ice, consisting of a chamber adapted to contain a high temperature latent heat of fusion substance and a chamber adapted to contain a low temperature latent heat of fusion substance and a chamber adapted for the circulation of a refrigerant fluid therein and a thermostat, the low temperature chamber being in heat conducting contact with the refrigerant chamber and with the water to be frozen and with the high temperature chamber, the high temperature chamber being in heat conducting contact with the air to be cooled, the thermostat being adapted to start and stop the circulation of the refrigerant in the refrigerant chamber within a desired temperature range in the low temperature chamber.

7. In a refrigerating process the method of freezing a latent heat of fusion substance by conducting heat therefrom to a circulating refrigerant fluid and cooling air by conduction of heat therefrom to said substance and, through said substance's temperature, automatically stopping the refrigerating effect of said refrigerant when the substance has been all or partly frozen and automatically starting the refrigerating effect of said refrigerant when the substance has been all or partly melted.

8. In a refrigerating process the method of freezing a latent heat of fusion substance by conducting heat therefrom to a vaporizing refrigerant fluid and cooling air by conduction of heat therefrom to said substance and, through said substance's temperature, automatically stopping the refrigerating effect of said refrigerant when the substance has been all or partly frozen and automatically starting the refrigerating effect of said refrigerant when the substance has been all or partly melted.

9. A cooling element adapted to cool air in a refrigerator, consisting of a chamber adapted to contain a latent heat of fusion substance and a chamber adapted for the circulation of a refrigerant fluid therein, a thermostat in heat conducting contact with said substance, the substance chamber being in heat conducting contact with air to be cooled and with the refrigerant chamber, the thermostat being adapted to start and stop the circulation of the refrigerant in the refrigerant chamber within a desired temperature range in the substance chamber, said thermostat being so located as not to be actuated until a major portion of said substance has been frozen.

10. In a household refrigerating system the combination of a compressor, condenser and motor with a latent heat of fusion air-cooling element in a refrigerator, having a refrigerant chamber and a substance chamber and a thermostat therein, means to cause the motor to actuate the compressor, a discharge conduit leading from the compressor to the condenser, a liquid conduit leading from the condenser to the refrigerant chamber, a suction conduit leading from the refrigerant chamber to the compressor, means to cause the thermostat to stop the motor when the substance is all or partly frozen and to start the motor when the substance is all or partly melted, means to automatically control the flow of liquid refrigerant from the condenser to the refrigerant chamber.

11. In a household refrigerating system the combination of a compressor, condenser and a motor with a latent heat of fusion air cooling and ice making element in a refrigerator, said element having a high temperature and a low temperature latent heat of fusion chamber, said low temperature chamber having a refrigerant chamber and a thermostat therein and contacting with said high temperature chamber, said high temperature chamber adapted to cool air and said low temperature chamber adapted to cool said high temperature chamber and to freeze ice, means to cause the motor to actuate the compressor, a discharge conduit leading from the compressor to the condenser, a liquid conduit leading from the condenser to the refrigerant chamber, a suction conduit leading from the refrigerant chamber to the compressor, means to cause the thermostat to stop the motor when the low temperature substance is all or partly frozen and to start the motor when the low temperature substance is all or partly melted, means to automatically control the flow of liquid refrigerant from the condenser to the refrigerant chamber.

12. In an air cooling process the method of partially freezing a liquid to cause it to cool an air cooling surface and then arresting said freezing before the frozen liquid freezes to said surface to prevent an accumulation of frost on said surface when the freezing of said liquid is again continued.

13. Two latent heat of fusion chambers in heat conducting contact, the walls of one thereof diverging from the bottom towards the top.

14. Two latent heat of fusion chambers in heat conducting contact having the walls of each thereof diverging from the bottom towards the top.

LOUIS A. BENOIST.
GARDNER T. VOORHEES.